March 5, 1935.   A. A. GUZIEL ET AL   1,993,242

TESTING DEVICE FOR INTERNAL COMBUSTION ENGINES

Original Filed Sept. 26, 1933   3 Sheets-Sheet 1

Inventors
Alexander A. Guziel
and
Arnold Kopf
By Percy H. Moore
Attorney

March 5, 1935. A. A. GUZIEL ET AL 1,993,242

TESTING DEVICE FOR INTERNAL COMBUSTION ENGINES

Original Filed Sept. 26, 1933   3 Sheets-Sheet 2

Inventors
Alexander A. Guziel
and
Arnold Kopff
By Percy H. Moore
Attorney

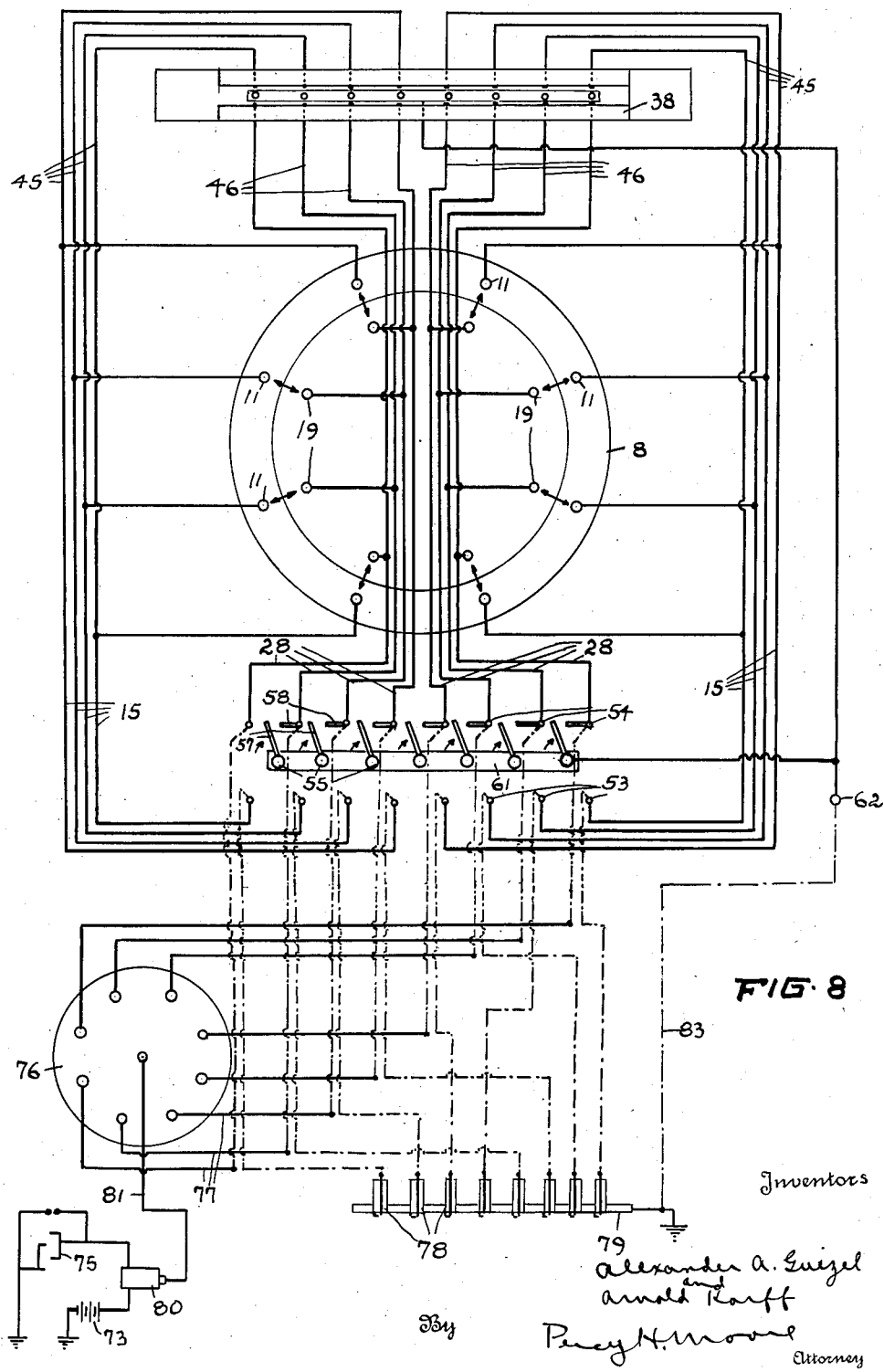

Patented Mar. 5, 1935

1,993,242

UNITED STATES PATENT OFFICE 1,993,242

TESTING DEVICE FOR INTERNAL COMBUSTION ENGINES

Alexander A. Guziel and Arnold Korff, Hollywood, Calif.

Application September 26, 1933, Serial No. 691,069
Renewed January 10, 1935

7 Claims. (Cl. 175—183)

This invention relates in general to testing devices for internal combustion engines and more particularly to testing devices designed for use with a multiple cylinder internal combustion engine for ascertaining whether or not the spark plugs of the engine are in proper operating condition and whether or not the compression and suction action of each cylinder is satisfactory to insure sufficient power and high efficiency of the engine.

It is a general object of this invention to provide a simple, practical and effective testing device for ascertaining whether the firing of the spark plugs of an engine is weak or intermittent or otherwise working ineffectively during operation of the engine, due to burnt improperly spaced or short-circuited plugs, and whether or not the timing of the engine is proper and the compression and suction of each cylinder satisfactory.

As well known proper firing of the cylinders of an engine with ignition systems commonly employed in multiple cylinder internal combustion engines mainly depends upon proper operating condition of the spark plugs, proper compression and suction of the cylinders and proper timing of the engine. Thus missing of the cylinders with spark plugs in good working condition is often caused by low compression and suction action of the cylinders, particularly, where the firing of the sparks is not properly timed.

It is a primary object of this invention to provide a testing device for an internal combustion engine whereby the spark plugs of the ignition system, the compression and suction action of the cylinders and the timing can be properly tested.

Another object of the invention is to provide a testing device of the character mentioned, whereby spark plug defects and defects in the compression and suction action of the cylinders can be easily and quickly located without exposing the operator to shocks from the high tension current.

A further object of this invention is to provide a testing device of the character mentioned suitable for portable use.

A still further object of the invention is to provide various improved practical and efficient parts in a testing device of the character mentioned.

The various objects and features of our invention will be best and more fully understood from the following detailed description of a typical form and application of the invention through which description we refer to the accompanying drawings, in which:

Figure 8 is a diagrammatic view illustrating the device provided by this invention operatively connected with the ignition circuit of an internal combustion engine.

Figure 1:
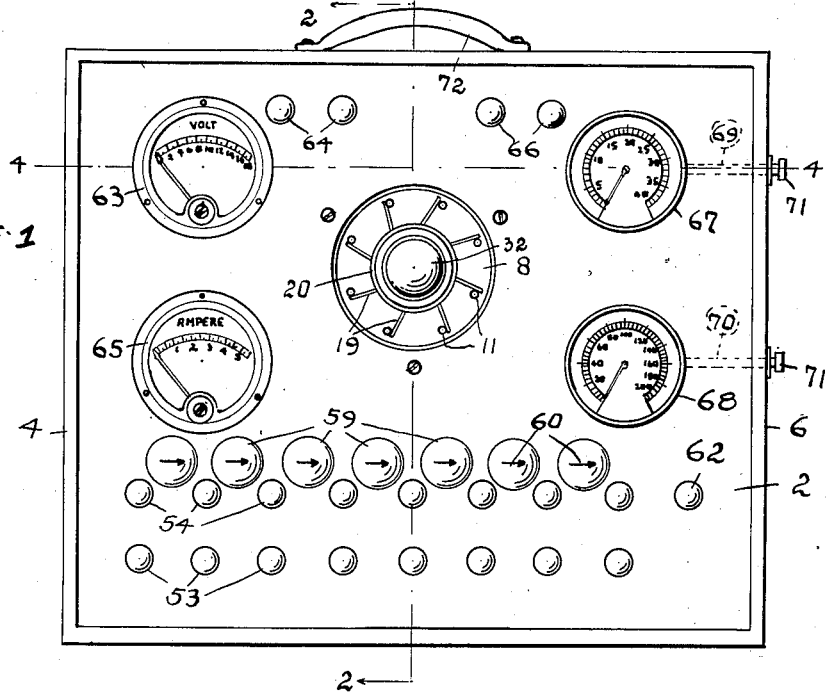
Figure 1 is a face view of the testing device mounted in a box, the instrument board being openly exposed by removing the front wall of the box.
Figure 2:
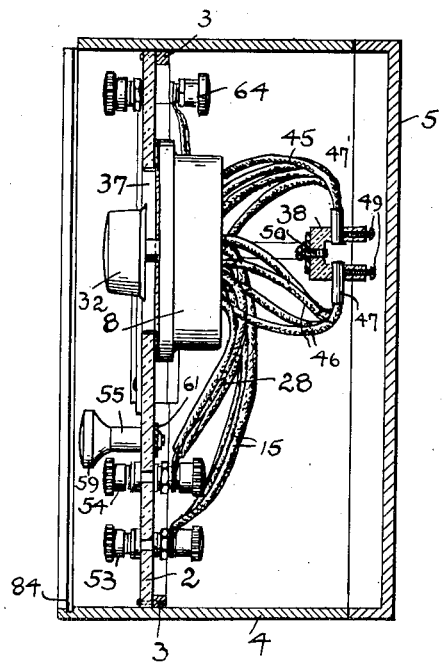
Figure 2 is a transversal sectional view on line 2—2 of Figure 1.
Figure 3:
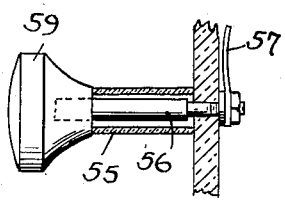
Figure 3 is an enlarged sectional view through one of the eliminating switches.
Figure 4:
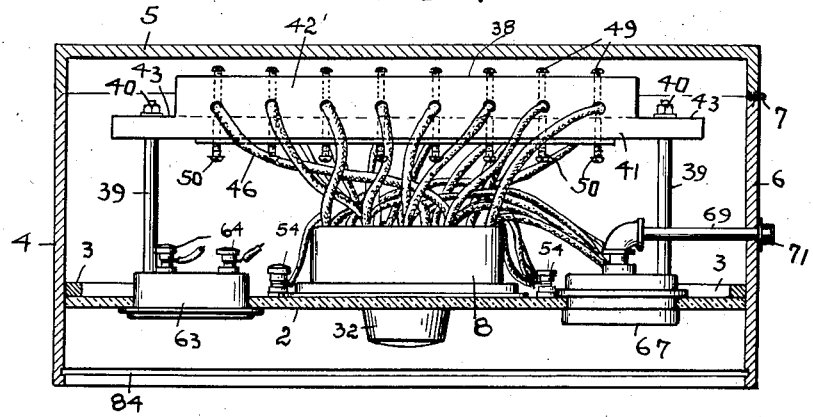
Figure 4 is a horizontal sectional view on line 4—4 of Figure 1.
Figure 5:
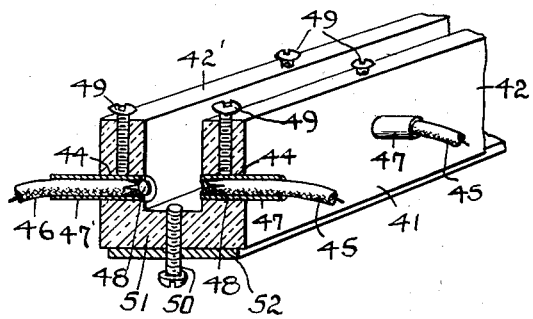
Figure 5 is an enlarged fragmentary perspective view of the auxiliary spark controlling device with adjustable electrodes secured thereto.
Figure 6:
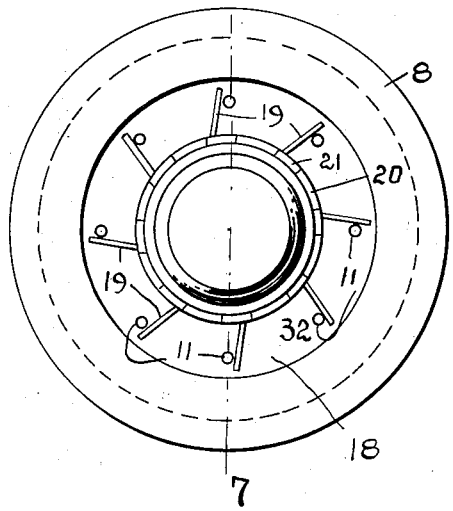
Figure 6 is a front view of the spark indicator.
Figure 7:
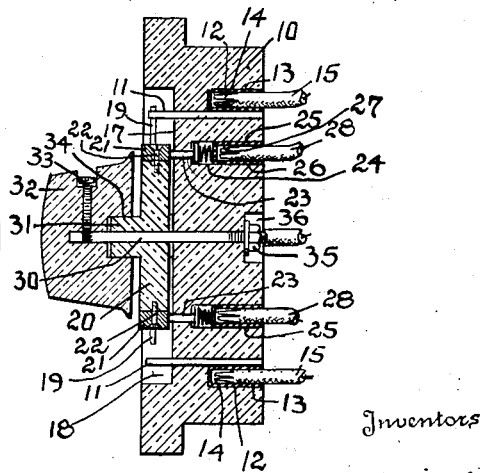
Figure 7 is a sectional view on line 7—7 of Figure 6.

The preferred form of construction as illustrated in the drawings comprises a base or instrument board 2 of fiber or any other suitable material, upon which all the parts of the testing device are mounted. This board is preferably screwed to supporting bars 3, arranged in a box 4, provided with a removable front wall (not shown) adapted to be guided in grooves 84 formed in the front end of the box. A back 5 is hingedly connected with the side wall 6 of the box by means of a hinge 7. Base board 2 centrally supports a spark indicating and controlling instrument 8 suitably secured thereto and adapted to be used for indicating the spark plug action of an engine embodying from two to eight cylinders. This instrument comprises a circular hard rubber or bakelite flanged base member 10 carrying eight circularly arranged contact members 11 equally spaced from each other and the central axis of said plate. These contact members are fully extended through said base member and are welded at their sides and rear ends to hollow tubular connecting tubes 12, in turn sleeved within recesses 13 formed in the rear face of base member 10 and adapted to frictionally embrace and support metal contact shoes 14 which are sleeved upon and electrically connected with lead wires 15 for the spark plugs 78, see Figures 7 and 8. The front ends of contact members 11 project beyond the bottom wall 17 of a circular recess 18 within the front portion of base member 10 for cooperation with a corresponding number of electrical contact members 19, mounted on a manually rotatable bakelite disk 20 arranged within the recess 18. Contact members 19 radiate from the periphery of disk 20 and are suitably secured to metal shoes 21 in turn inset within the recessed periphery of said disk and connected therewith by means of screws 22. Rotation of disk 20 causes an increase or decrease in the width of the air gaps between contact members 11 and 19 or closes these gaps entirely when members 19 are contacting with members 11. A plurality of spring pressed brushes 23, slidably arranged within openings 24 in base member 10 electrically connect the metal shoes 21 and contact members 19 with a corresponding number of connecting tubes 25, sleeved within larger openings 26 formed in the base member 10 in axial alignment with openings 24 and adapted to frictionally receive and support metal contact shoes 27, which are sleeved upon and electrically connected with lead wires 28 for connection with the grounded body 79 of the engine, see Figures 7 and 8.

Bakelite disk 20 is rotatably secured to base plate 10 by means of a shaft 30, which extends axially through a bore common to the disk and its square headed hub portion 31. This shaft carries at its front end an operating knob 32, secured thereto by means of a screw 33, to facilitate manual adjustment of the air gaps between contact members 11 and 19. For this purpose knob 32 is provided with a rectangularly shaped recess 34 which is sleeved upon and non-rotatably coupled with hub portion 31 to effect joint movement of knob 32 and disk 20. The rear end of shaft 30 is secured in proper working position by means of a nut 35 housed within the recess 36.

The spark indicating and controlling instrument, which is openly exposed through an opening 37 in base board 2 to permit of observation of the spark and manual control of same as previously described, cooperates with an auxiliary controlling device 38 rigidly mounted adjacent the rear wall of base plate 2 upon posts 39 by means of nuts 40. Controlling device 38 comprises a U-shaped stationary holder or block 41 of insulating material having its bifurcations or flanges 42, 42' cut away at opposite ends as at 43, to facilitate assembly with posts 39. Each of the flanges 42, 42' are provided with symmetrically arranged aligned bores or perforations constituting pairs of oppositely arranged channels 44, supporting eight pairs of lead wires 45 and 46 respectively. These lead wires carry at their opposed ends tubular contact members 47, 47' fully extended through said channels 44 and sleeved upon and adapted to frictionally embrace and support metal contact shoes 48, which are electrically connected with said wires. The front ends of contact members 47, 47' project slightly beyond the inner walls of flanges 42, 42' and are adjustably held in such position by means of screws 49, for cooperation with eight screw contact members 50, (one member for each pair of contact members 47, 47') adjustably mounted in the web 51 of block 41, and electrically connected with each other by means of a metal strip 52. It can be seen that vertical adjustment of screw contact members 50 varies the air gap between contact members 47, 47' and members 50 and thus permits of proper adjustment of these gaps to the desired distance, preferably about two and one half thousandths of an inch.

The lower portion of base board 2 carries a number of pairs of binding posts 53, 54 for making the desired electrical connection between the testing device and the spark plugs of an engine and other connections as will be hereinafter described. There are eight pairs of binding posts electrically connected with the spark indicating instrument 8 and the auxiliary spark controlling device 38. Thus the lower binding posts 53, are connected to contact members 11 and contact members 47 in flange 42 by means of the lead wires 15 and 45, and the upper binding posts 54 are connected to contact members 19 and contact members 47' in flange 42' by means of lead wires 28 and 46 respectively.

Seven rotatable switches 55 permit of selectively short circuiting the spark circuits embodying the gaps in the spark indicating instrument 8, the corresponding spark gaps in the auxiliary spark controlling device 38 and the spark plugs 78. These switches 55 each comprise a shaft 56 pivotally secured to base board 2, which shaft carries at its inner end a contact blade 57 adapted to electrically contact with metal strips 58 secured to binding posts 54 when shaft 56 is rotated in clockwise direction, see Figure 8. A knob 59, having an arrow 60 for indicating the position of the switch, is secured to the outer end of shaft 56 to facilitate manual operation. All the switches 55 are electrically connected with each other by means of a metal strip 61, in turn electrically connected to a binding post 62, which post is also electrically connected with metal strip 52 of device 38 to permit of short circuiting the desired circuits by selective operation of switches 55, as will be later described.

Base board 2 supports a volt-meter 63, electrically connected to binding posts 64, an ampere meter 65, electrically connected to binding posts 66, a vacuum gauge 67 and a pressure gauge 68. The vacuum and pressure gauges are in communication with pipes 69 and 70 respectively, which pipes extend through the side wall 6 of box 4 for connection with the cylinder or manifold of an engine, if so desired. Caps 71 at the ends of the pipes 69 and 70 prevent dirt from entering into gauges 67 and 68 when the latter are not in use.

The testing means thus described is capable of testing the action of the spark plugs of an ignition system connected to the instrument as shown in dash-dotted lines in the diagram of Figure 8. In this diagram we have illustrated the wiring of the unitary instrument in connection with a typical form of ignition system commonly used on multiple cylinder internal combustion engines suitable for motor vehicles, airplanes, motor boats etc. This ignition system includes a battery 73, a high tension coil 80, a condenser 75 and a distributor 76, which feeds the current through eight high tension wires 77 to the respective spark plugs 78.

To test the condition of the spark plugs of an engine the high tension wires 77 are disconnected from their respective spark plugs 78 and connected to binding posts 54 of the instrument, and the binding posts 53 are connected to the spark plugs, and finally the binding post 62 is connected to the engine block 79, all as illustrated by dash-dotted lines in Figure 8. The high tension current fed from high tension coil 80, through lead wire 81 into distributor 76, now flows through the respective high tension wires 77 to the corresponding contacts 54, and hence through the respective lead wires 28 to contact members 19. After jumping the respective gaps between contact members 19 and 11, the current flows through the respective lead wires 15 to and through contacts 53 and finally to and through the respective spark plugs 78, jumping the air gaps of the latter and then passing through the engine block 79 back to coil 80. The circuit for the high tension current of the secondary winding of coil 80, is shunted over auxiliary spark controlling device 38, to permit of selective passage of the high tension current either through spark indicating device 8 or auxiliary spark controlling device 38, during the testing and comparison of the spark plugs 78 and the width of their spark gaps with the properly conditioned and properly set spark gaps of auxiliary controlling device 38. Thus lead wires 28 are connected with lead wires 45, and lead wires 15 are connected with lead wires 46, to permit shunting of the current over the spark gaps of device 38 to the engine block 79.

The arrangement described makes it possible to test the width of the gaps of plugs 78 and to compare the sparks of these plugs with each other by mere rotation of disk 20, and observation of the sparks jumping in spark controlling device 8, marks 82 on device 8 being arranged to indicate the setting of disk 20 at which the sparks should jump the gaps in said controlling device 8 rather than the gaps in device 38. When one or more of the spark gaps of device 8 fail to show a spark, this will indicate that the plug is foul and should be replaced. To permit of closer scrutiny of a faulty spark plug without unscrewing same all other plugs except the first one can be short-circuited by means of switches 55 for running the engine on two cylinders, that is the first and faulty cylinder. If at this time a spark for the faulty plug does not show up on sparking device 8 then the operator disconnects lead wire 83 to the motor body 79, and spark detecting device 8 indicates that the faulty plug still continues to miss, then the operator may reasonably be assured that a bad lead or short circuit exists in the feed line for the spark plug, or that the plug itself has become short circuited and dead.

In order to test the relative suction and compression of the cylinders of an internal combustion engine, the ignition circuit is first tested in the manner described, and thereafter by operation of switches 55 and cutting out of cylinders, the bad cylinders are determined by a process of elimination. The thus determined relative suction and compression action of the cylinders may then be checked individually by the suction and pressure gauge of the testing device, keeping in mind that the switching means 55 permit of the cylinders being switched in and out at will, thus insuring very accurate calculations or comparisons where desired.

The timing of an internal engine may also be checked after the ignition circuit has been tested, by connecting the pressure and suction gauges with the engine and observing the compression and suction of the engine while actuating switches 55, and therewith by a process of elimination timing the engine in relation to the suction and pressure action of the engine. This is very important, because motors with worn cylinder walls will function with a fair degree of efficiency when properly timed.

Having thus described only a typical preferred form of our invention we do not wish to limit ourselves to the specific details set forth, but wish to reserve to ourselves any changes or variations that may appear to those skilled in the art or fall within the scope of the following claims.

Having thus described our invention, what we claim is:

1. A unitary testing device for internal combustion engines embodying high tension electrical ignition circuits, comprising a spark controlling device for visibly indicating sparks, embodying means for readily adjusting the size of the spark gaps of said device to the size of the gaps of common spark plugs, and a grounded auxiliary spark controlling device embodying properly set spark gaps, said auxiliary device being shunted with respect to said first device and adapted to shunt the current flowing through said first device when the spark plugs of the engine to be tested are carbonized or dirty.

2. A unitary testing device for internal combustion engines embodying high tension electrical ignition circuits, comprising a spark controlling device for visibly indicating sparks, means on said controlling device for readily changing the spark gaps of said device, a grounded auxiliary spark controlling device embodying properly set spark gaps and adapted to shunt the current flowing through said first device when the spark plugs of the engine to be tested are foul and individual means for short circuiting the electrical ignition circuits for a number of the spark plugs of the engine.

3. A unitary testing device for internal combustion engines embodying high tension electrical ignition circuits, comprising a spark controlling device for visibly indicating sparks, means on said controlling device for readily changing the spark gaps of said device, and a grounded auxiliary spark controlling device embodying spark gaps set to a width of slightly more than the spark gaps of common spark plugs to permit shunting and short circuiting of the spark plugs of the engine to be tested when the electrodes of the plugs are not properly spaced and/or foul.

4. A unitary testing device for internal combustion engines embodying high tension electrical ignition circuits, comprising a spark controlling device for visibly indicating sparks, means on said controlling device for readily changing the spark gaps of said device to the desired width, an auxiliary spark controlling device electrically connected with and shunted with respect to the first spark controlling device and adapted to be connected with the ground of the engine to be tested to shunt the current of the ignition circuit with respect to said first controlling device, said auxiliary controlling device embodying adjustable spark gaps set to a width of slightly more than the spark gaps of common spark plugs adapted to shunt and short circuit the spark plugs of an engine, when the first spark controlling device is set to have spark gaps equal to the gaps of common spark plugs and the electrodes of the plugs are not properly spaced and/or foul.

5. A unitary testing device for internal combustion engines embodying high tension electrical ignition circuits according to claim 4, including manually operable switching means adapted to be electrically connected with said ignition circuit and the ground connection of the engine to be tested for selective short circuiting of the spark plugs of said engine.

6. A unitary testing device for internal combustion engines embodying high tension electrical ignition circuits comprising a spark controlling device including adjustable electrodes for visibly indicating sparks, means for manually adjusting said electrodes with respect to each other, means to connect the electrodes of said spark controlling device with the ignition circuit of said engine, a second spark controlling device embodying properly set spark gaps and means to connect said second spark controlling device with the ignition circuit of said engine and to shunt said device with respect to said first spark controlling device, said means including a ground connection from said second spark controlling device to the body of said engine.

7. A unitary testing device for internal combustion engines embodying high tension electrical ignition circuits according to claim 6, including manually operable switching means electrically connected to the said ground connection adapted to be selectively connected with ignition circuit of said engine for selectively short circuiting the plugs of said engine.

ALEXANDER A. GUZIEL.
ARNOLD KORFF.